(12) United States Patent
Kato

(10) Patent No.: US 7,534,074 B2
(45) Date of Patent: May 19, 2009

(54) FLOW PATH SWITCHOVER DEVICE FOR PARTICULATE TRANSPORT

(75) Inventor: Fumio Kato, Aichi (JP)

(73) Assignee: Tsukasa Co., Ltd. (JP)

( * ) Notice: Subject to any disclaimer, the term of this patent is extended or adjusted under 35 U.S.C. 154(b) by 185 days.

(21) Appl. No.: 11/829,632

(22) Filed: Jul. 27, 2007

(65) Prior Publication Data

US 2008/0159818 A1 Jul. 3, 2008

(30) Foreign Application Priority Data

Dec. 27, 2006 (JP) .............................. 2006-352266

(51) Int. Cl.
*B65G 51/24* (2006.01)
*F16K 1/16* (2006.01)

(52) U.S. Cl. ........................ 406/183; 137/875; 137/876; 251/367

(58) Field of Classification Search ......... 406/181–183, 406/127, 131; 285/132.1, 131.1, 130.1, 125.1, 285/416, 363, 412; 137/861, 872, 875, 876, 137/625.44, 625.45, 625.46, 625.48, 625; 251/306, 307, 366, 367; 403/337
See application file for complete search history.

(56) References Cited

U.S. PATENT DOCUMENTS

| | | | | |
|---|---|---|---|---|
| 346,821 A | * | 8/1886 | Mock | 137/555 |
| 797,253 A | * | 8/1905 | Banister | 137/625.44 |
| 913,400 A | * | 2/1909 | Kimball | 137/625.44 |
| 2,214,736 A | * | 9/1940 | Carmichael et al. | 406/120 |
| 3,228,653 A | * | 1/1966 | Trimmer | 251/306 |
| 3,773,062 A | * | 11/1973 | McIver | 137/1 |
| 4,718,457 A | * | 1/1988 | Luger | 137/875 |
| 5,188,339 A | * | 2/1993 | Bartoschek et al. | 251/367 |
| 5,265,547 A | * | 11/1993 | Daws | 111/175 |
| 6,182,699 B1 | * | 2/2001 | Hawkes | 137/875 |
| 6,996,955 B2 | * | 2/2006 | White et al. | 53/495 |

FOREIGN PATENT DOCUMENTS

| | | |
|---|---|---|
| DE | 8811969 | 9/1988 |
| DE | 19925345 | 9/2000 |
| GB | 933426 | 8/1963 |

* cited by examiner

*Primary Examiner*—William R. Harp
(74) *Attorney, Agent, or Firm*—Rodman & Rodman

(57) ABSTRACT

In order to prevent the contamination of particulates such as food material particulates, facilitate maintenance, and to enhance the process sealing accuracy, a flow path switchover device is presented. The device of the present invention has a tube assembly including first and second main tube members and a branch member. The first and second main tube members are interconnected via a first ring member. The first main tube member and the branch member are interconnected via a second ring member arranged at a preset angle with the first ring member. A metal changeover damper supported on a rotating shaft swings between the first and second ring members and accordingly blocks and seals either the connection between the first main tube member and the second main tube member or the connection between the first main tube member and the branch tube member, while allowing the other connection.

4 Claims, 10 Drawing Sheets

FIG. 3
(a)
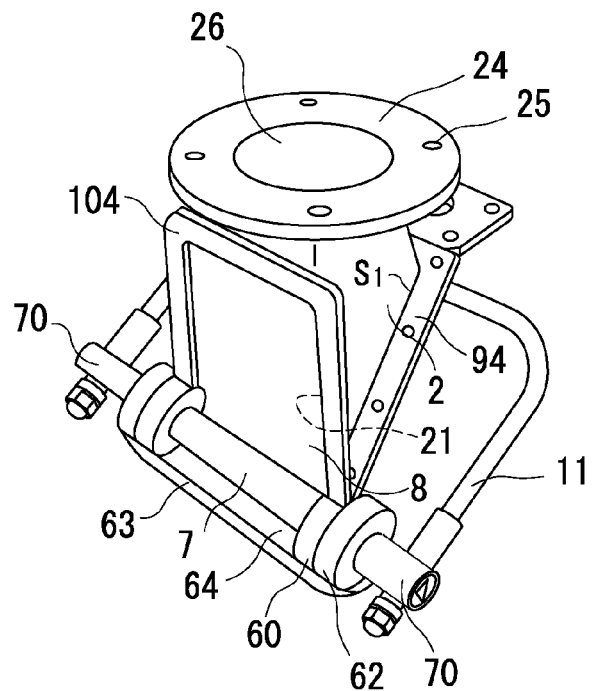
(b)
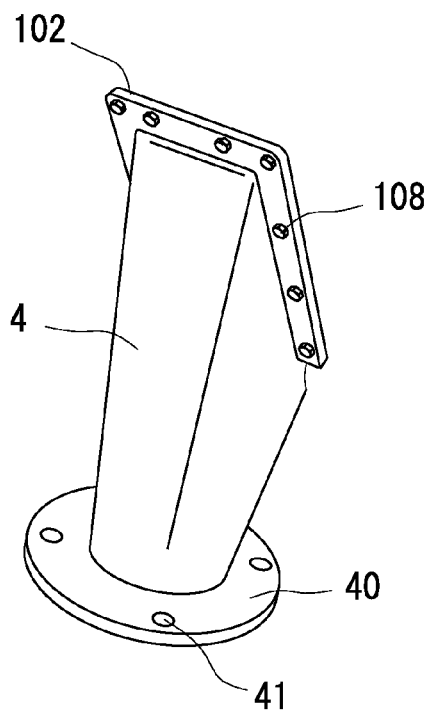
(c)
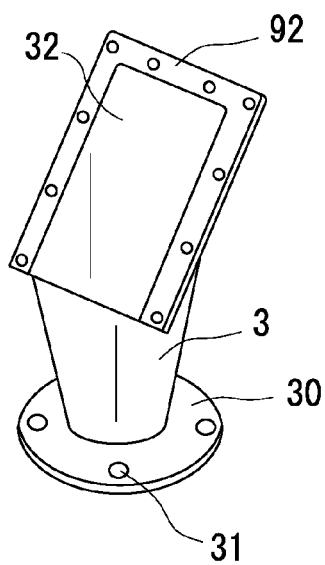

FIG. 5
(a)
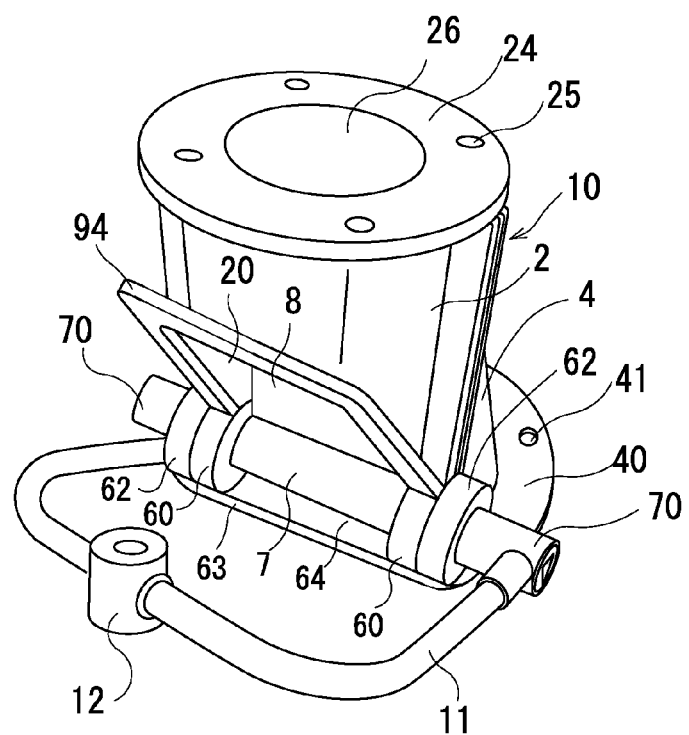
(b)
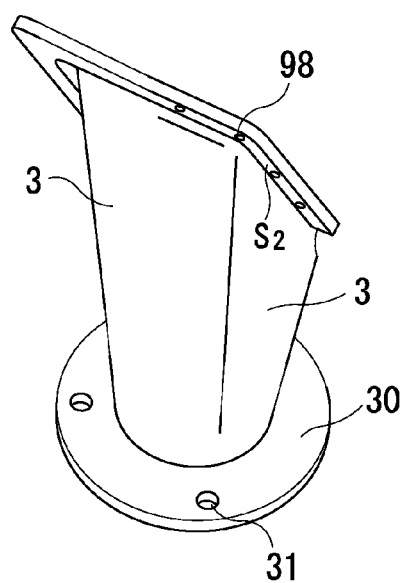

FIG. 7
(a)
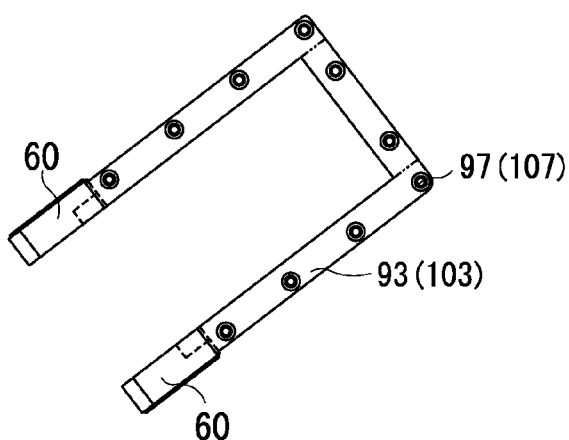
(b)
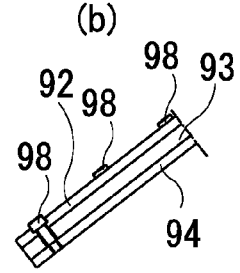
(c)
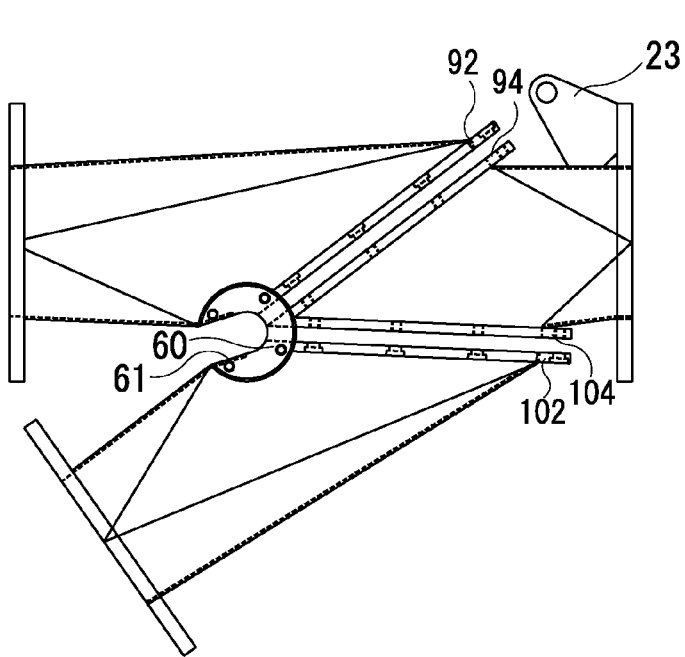
(d)
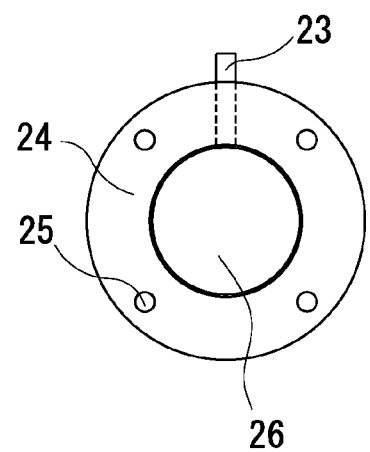

FIG. 10
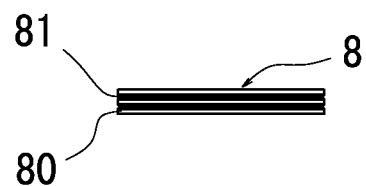
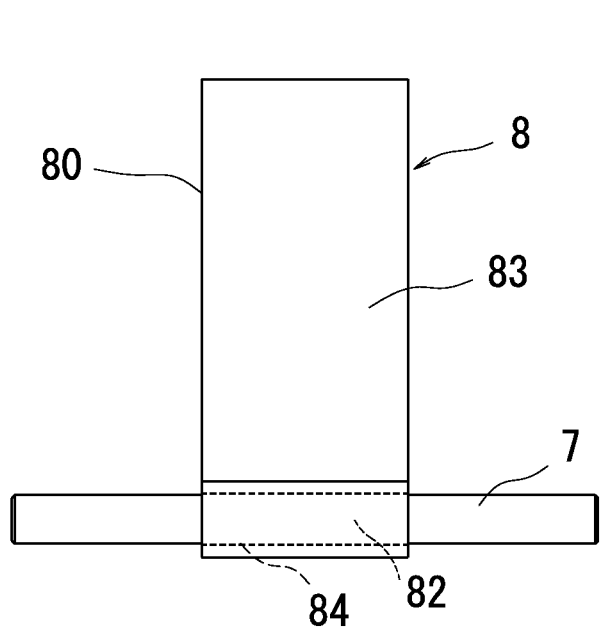 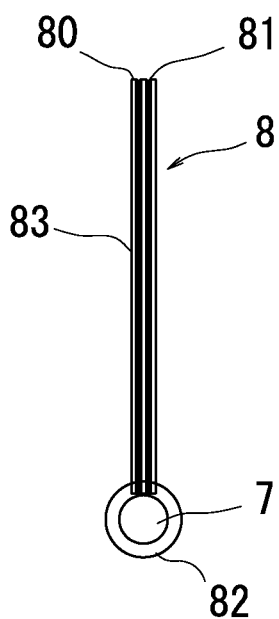
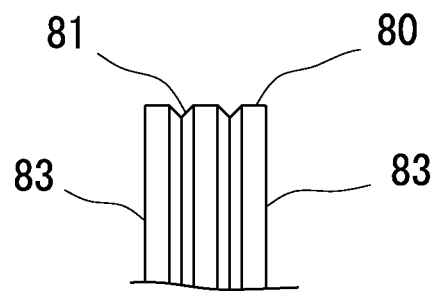

FLOW PATH SWITCHOVER DEVICE FOR PARTICULATE TRANSPORT

CROSS-REFERENCE TO RELATED APPLICATIONS

This application claims priority to Japanese Patent Application No. 2006-352266 filed Dec. 27, 2006, the contents of which are incorporated herein by reference.

TECHNICAL FIELD

The present invention relates to a flow path switchover device for pneumatic particulate transport of the damper structure. This flow path switchover device for particulate transport is adopted in pneumatic transport plants of various particulates, for example, food, medicines, feedstuff, and fertilizers. The flow path switchover device changes over the flow path to mix multiple particulates pneumatically supplied from respective material tanks at a preset mixing rate and transport the mixed particulates.

BACKGROUND ART

As described in cited Patent Documents 1 and 2, the basic structure of a flow path switchover device has a tube assembly including a main tube member and a branch tube member. A changeover damper is provided in the tube assembly to swing about a rotating shaft as the supporting point. The outer circumferential edge of the changeover damper has a packing.

The rotating shaft is rotated by adequate means to swing the changeover damper. The packing of the swinging changeover damper is in pressure contact with an inner wall face of the tube assembly to block the joint of the main tube member and the branch tube member and allow connection between an inlet and an outlet of the main tube member or to block the middle of the main tube member and allow connection between the inlet or the outlet of the main tube member and the branch tube member. The flow path is changed over in this manner. The packing controls the amount of air leakage to a relatively low level even in the high blower pressure condition, compared with a conventional flow path switchover device, for example, a cast ball valve.

The respective tube members are produced as pressed sheet metal parts, which are mutually connected by welding. This structure is lighter in weight than the conventional flow path switchover device, for example, the cast ball valve, and attains the easy processing and good cost performance.

Patent Document 1: Japanese Utility Model Publication Gazette No. S-63-33858

Patent Document 2: Japanese Utility Model Publication Gazette No. H02-19673

SUMMARY OF THE INVENTION

In this proposed structure, however, deterioration or damage of the packing may cause invasion of the packing piece as the foreign matter into the particulate or lead to contamination of, for example, the food material particulate with mold or bugs. The enhanced sealing property is thus demanded for the safety of especially the food material particulate. Another disadvantage of the proposed structure is replacement of the packing as the consumable supply at regular intervals.

The curved sealing is formed by sheet metal processing of, for example, stainless steel. This requires the sheet metal processing technique of the skilled worker. Even the sheet metal processing skill may still give a production error in sealing and does not ensure the stable sealing of the high processing accuracy.

There are requirements for restraining particulate, for example, food material particulate, from being contaminated with any foreign matters, for facilitating the maintenance, and for enhancing the processing accuracy of the sealing.

In order to attain these requirements, a flow path switchover device for particulate transport has: a tube assembly that includes a main tube member and a branch tube member; a rotating shaft that is supported on a bearing member in a freely rotatable manner; and a metal changeover damper that is fixed to the rotating shaft and swings about the rotating shaft as a supporting point in the tube assembly. The main tube member has obliquely cut first main tube member and second main tube member. The first main tube member has a first opening and a second opening on one end thereof. The first opening of the first main tube member is connected with the second main tube member via a metal first ring member having an open end. The second opening of the first main tube member is connected with the branch tube member via a metal second ring member, which has an open end and is arranged at a preset angle with the first ring member. The rotating shaft and the bearing member are arranged at a boundary between the first opening and the second opening. The first ring member, the second ring member, the second main tube member, and the branch tube member are connected to the bearing member. The changeover damper swings between the first ring member and the second ring member about the rotating shaft as the supporting point. An outer circumferential end face of the metal changeover damper is in pressure contact with an inner circumferential end face of the metal first ring member or with an inner circumferential end face of the metal second ring member to block and seal either connection between the first main tube member and the second main tube member or connection between the first main tube member and the branch tube member.

The flow path switchover device for particulate transport of the invention has the following effects:

(1) The sealing is formed by the pressure contact of the metal parts. This structure desirably restrains any contamination and invasion of any foreign matters, for example, fractured sealing pieces, mold, and bugs and effectively prevents the air leakage; and (2) The two separate parts of the main tube member and the presence of the first ring member and the second ring member attain stable sealing of high processing accuracy.

In one aspect of the flow path switchover device for particulate transport of the invention, the tube assembly is produced by sheet metal processing of a metal steel plate, and the changeover damper, the first ring member, and the second ring member are machined metal steel parts produced by machining a metal steel plate. The changeover damper, the first ring member, and the second ring member have larger thicknesses than a wall thickness of the tube assembly. The first main tube member is welded to the first ring member and to the second ring member. The second main tube member is welded to the bearing member and to the first ring member. The branch tube member is welded to the bearing member and to the second ring member.

The sheet metal processing of the tube assembly and the high-precision machining of the first ring member and the second ring member further enhance the processing accuracy of the sealing.

In another aspect of the flow path switchover device for particulate transport of the invention, the first ring member and the second ring member respectively have a laminate structure including at least three U-shaped steel plates. A middle steel plate is interposed between and fastened with at least two side steel plates.

This arrangement facilitates the attachment of the first ring member and the second ring member and effectively prevents the potential air leakage.

For the enhanced sealing properties between the changeover damper and the first ring member and between the changeover damper and the second ring member, the outer circumferential end face of the changeover damper may have one or plural grooves formed in parallel to a longitudinal direction of the outer circumferential end face. The inner circumferential end faces of the first ring member and the second ring member may be inclined to have sloping surfaces to the outer circumferential end face of the changeover damper. The outer circumferential end face of the changeover damper is in pressure contact with these sloping surfaces. When the first ring member and the second ring member includes at least three steel plates, the sloping surface may be formed on one of the three steel plates, preferably a middle steel plate.

BRIEF DESCRIPTION OF THE DRAWINGS

FIG. 3 is a decomposed perspective view showing the flow path switchover device of the embodiment: FIGS. 3(a), 3(b), and 3(c) respectively show a first main tube member, a branch tube member, and a second main tube member;

FIG. 5 is a decomposed perspective view showing the flow path switchover device of the embodiment from the different angle: FIGS. 5(a) and 5(b) respectively show the first main tube member (without fixing pieces) and the second main tube member;

FIG. 7(a) is a side view showing a middle steel plate of a first ring member (or a middle steel plate of a second ring member) included in the flow path switchover device of the embodiment;

FIG. 7(b) is a partial front view showing the first ring member in a clamped state;

FIG. 7(c) is a front view showing a main body of the flow path switchover device;

FIG. 7(d) is a side view showing the first main tube member;

FIG. 10(a) is a plan view showing the changeover damper;

FIG. 10(b) is a side view showing the rotating shaft and the changeover damper;

FIG. 10(c) is a front view showing the rotating shaft and the changeover damper; and FIG. 10(d) is a partial enlarged view of FIG. 10(c).

BEST MODES OF CARRYING OUT THE INVENTION

Figure 1:
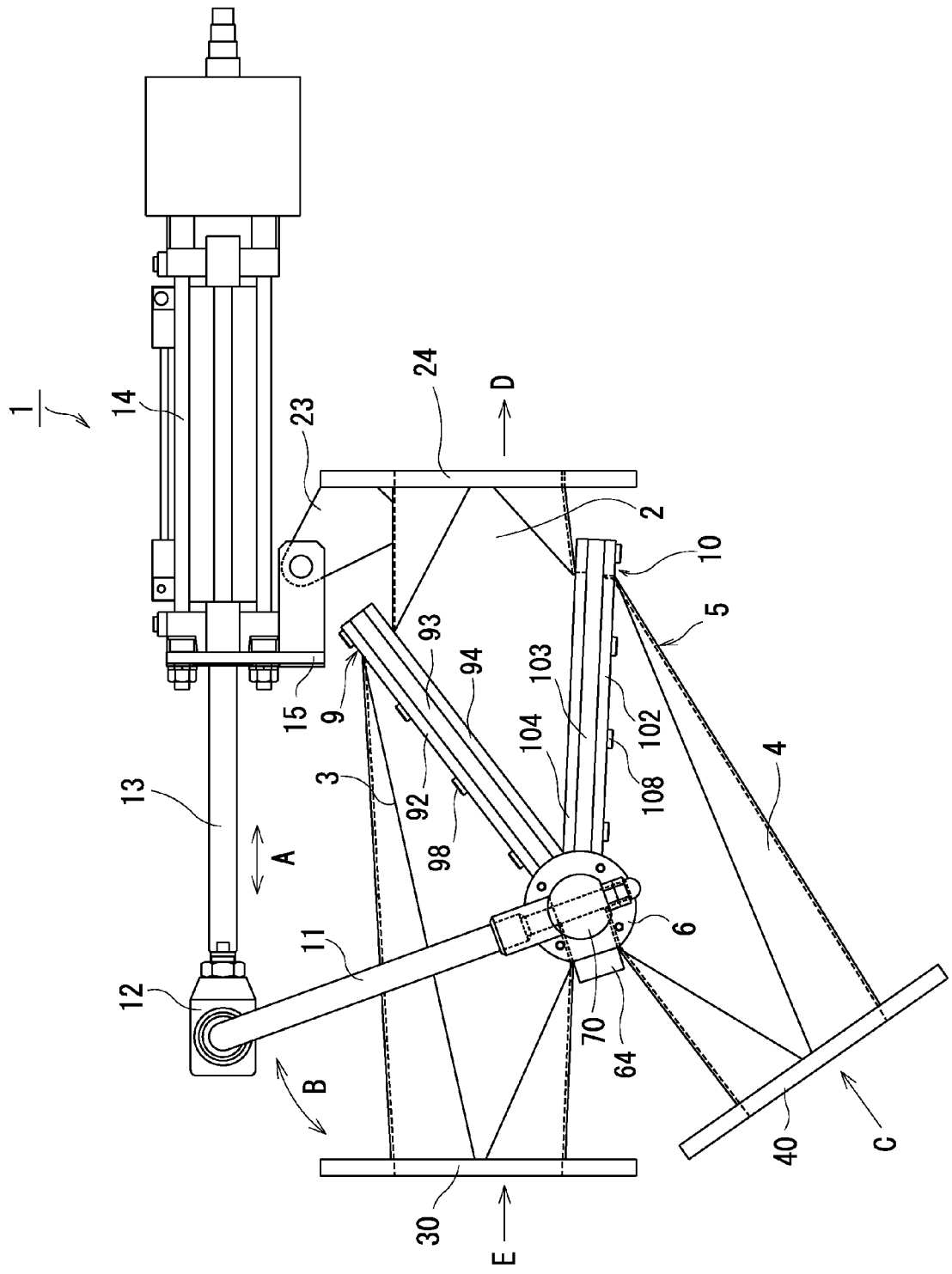
FIG. 1 is a front view showing a flow path switchover device in one embodiment of the invention.
Figure 2:
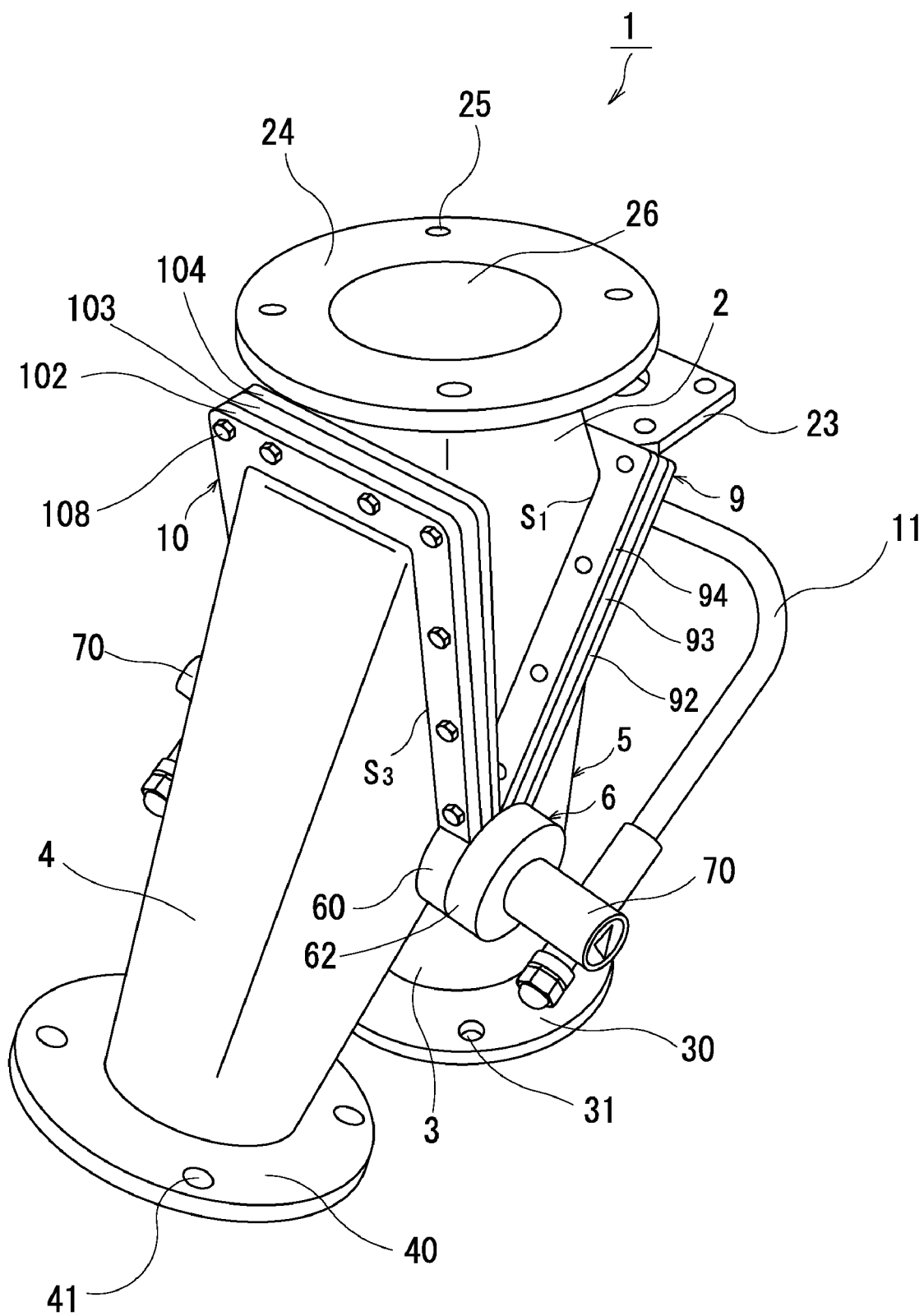
FIG. 2 is a perspective view showing the flow path switchover device of the embodiment.

A flow path switchover device 1 for particulate transport (hereafter simply referred to as 'flow path switchover device 1') is described below in detail as one embodiment of the invention with reference to the accompanied drawings. The flow path switchover device 1 is adopted for a particulate transport device requiring the high sealing property, for example, pneumatic transport (pressure feed), high-density transport, or the shoot transport of the particulate. In the structure of this embodiment, the flow path switchover device 1 has a two-way tubular structure.

As shown in FIGS. 1 through 10, the flow path switchover device 1 has a tube assembly 5 including a first main tube member 2, a second main tube member 3, and a branch tube member 4. The flow path switchover device 1 also has a rotating shaft 7 that is supported on bearing members 6 in a freely rotatable manner and a changeover damper 8 that is fixed to the rotating shaft 7 and swings about the rotating shaft 7 as the supporting point in the tube assembly 5. The first main tube member 2, the second main tube member 3, and the branch tube member 4 are separate members. The first main tube member 2 and the second main tube member 3 may be produced in different manufacturing steps or may be two parts obtained by cutting one sheet-metal tube member. The first main tube member 2 and the second main tube member 3 have a common central axis, which is arranged at an acute angle (preferably in a range of 30 to 40 degrees) with the center axis of the branch tube member 4. The first main tube member 2 and the second main tube member 3 are interconnected via a first ring member 9 having an open end 90. The first ring member 9 is arranged aslope at an acute angle with the center axis. A second ring member 10 having an open end 100 is arranged at an acute angle (preferably in a range of 30 to 50 degrees) with the first ring member 9. The lower end of the first main tube member 2 is connected to the upper end of the branch tube member 4 via the second ring member 10. A first opening 20 and a second opening 21 of the first main tube member 2 are arranged adjacent to each other in a V shape. The bearing members 6 are located at the lower ends of the first opening 20 and the second opening 21. The second main tube member 3 and the branch tube member 4 are connected to the respective ends of the bearing members 6. The changeover damper 8 swings between the first ring member 9 and the second ring member 10 about the rotating shaft 7 as the supporting point. An outer circumferential end face 80 of the metal changeover damper 8 is in pressure contact with an inner circumferential end face 91 of the steel plate 93 of the first ring member 9 or with an inner circumferential end face 101 of the metal second ring member 10. The changeover damper 8 accordingly blocks and seals either the connection between the first main tube member 2 and the second main tube member 3 or the connection between the first main tube member 2 and the branch tube member 4, while allowing the other connection.

A swing lever 11 is a U-shaped arm member having its lower ends fixed to the rotating shaft 7 and integrally swings with the rotating shaft 7 and the changeover damper 8. The swing lever 11 has a swing mechanism 12. The swing mechanism 12 is fixed to a piston rod 13 to swing the swing lever 11. An air cylinder 14 is arranged in parallel with the first main tube member 2 to integrally rotate the rotating shaft 7, the changeover damper 8, and the swing lever 11. The cylinder 14 has a bracket 15 that includes bolts and pins and is fixed to a fixing piece 23 of the first main tube member 2. The flow path switchover device 1 has solenoid valves and cylinder switches as the standard equipment. The respective constituents are described in detail below.

The tube assembly 5 including the first main tube member 2, the second main tube member 3, and the branch tube member 4 is a pressed sheet metal assembly made of steel, preferably stainless steel SUS 304. As illustrated, the cross sections of the first main tube member 2, the second main tube member 3, and the branch tube member 4 respectively vary from the rectangular shape to the circular shape. The first main tube member 2 and the second main tube member 3 are arranged coaxially, and the branch tube member 4 is inclined to the axial direction of the first main tube member 2 and the second main tube member 3. The first main tube member 2, the second main tube member 3, and the branch tube member 4 respectively have a flange 24 with attachment holes 25, a flange 30 with attachment holes 31, and a flange 40 with attachment holes 41. As shown in FIGS. 2 through 5, the first main tube member 2 has an upper opening 26, a first opening 20, and a second opening 21. The second main tube member 3 has an upper opening 32 and a lower opening 33 (see FIGS. 3(c) and 6). The branch tube member 4 has an upper opening 42 and a lower opening 43 (see FIG. 6).

The bearing members 6 are arranged in the axial direction to allow penetration of the rotating shaft 7 therebetween and support the front and rear ends of the rotating shaft 7 on the boundary between the second main tube member 3 and the branch tube member 4. The bearing members 6 have air-tight structure. Each of the bearing member 6 has a boss 60 connected with the respective ends of the second main tube member 3, the branch tube member 4, the first ring member 9, and the second ring member 10, a U-shaped groove 61 formed in the boss 60, and a bearing end 62 attached to the outside of the boss 60. The lower end of the changeover damper 8 is fixed to the rotating shaft 7 along the axial direction. A sealing element 63 is provided around the lower circumference of the rotating shaft 7 and is pressed by a lower sealing retainer 64.

The rotating shaft 7 has axial attachment sections 70 fixed to both ends thereof. The respective ends of the swing lever 11 are attached to the axial attachment sections 70.

The changeover damper 8 switches over the flow path of the particulate discharged from the upper opening of the first main tube member 2 to make the particulate flow into the obliquely lower opening of the branch tube member 4 or flow into the lower opening of the second main tube member 3. As shown in FIG. 10, the changeover damper 8 has multiple grooves 81 (a pair of grooves in the illustrated example) formed along the longer side (in a longitudinal direction) on the outer circumferential end face 80. The changeover damper 8 also has a joint element 82 provided on its lower end for fixation of the rotating shaft 7. The changeover damper 8 has a pair of main faces 83 formed on both sides thereof. The joint element 82 has a through hole 84 to receive and fasten the rotating shaft 7 fit therein. The inner circumferential end face 91 of the first ring member 9 and the inner circumferential end face 101 of the second ring member 10 have slope surfaces inclined to the outer circumferential end face 80. The edge of the outer circumferential end face 80 is in pressure contact with the slope surfaces of these inner circumferential end faces 91 and 101. There is a clearance formed other than the contact face. The clearance is gradually narrowed toward the swing end and disappears at the contact face. The edge of the outer circumferential end face 80 is in pressure contact with the slope surfaces as shown in FIG. 8(d). This arrangement desirably eliminates the potential influence of the production error and enhances the accuracy of the pressure contact, thus effectively preventing the air leakage. The clearance has a slope of 1 to 3 degrees to the opposed end face. The inner circumferential end face 101 of the second ring member 10 is inclined in a reverse direction to the inner circumferential end face 91 of the first ring member 9 as shown in FIG. 8(d).

Figure 4:
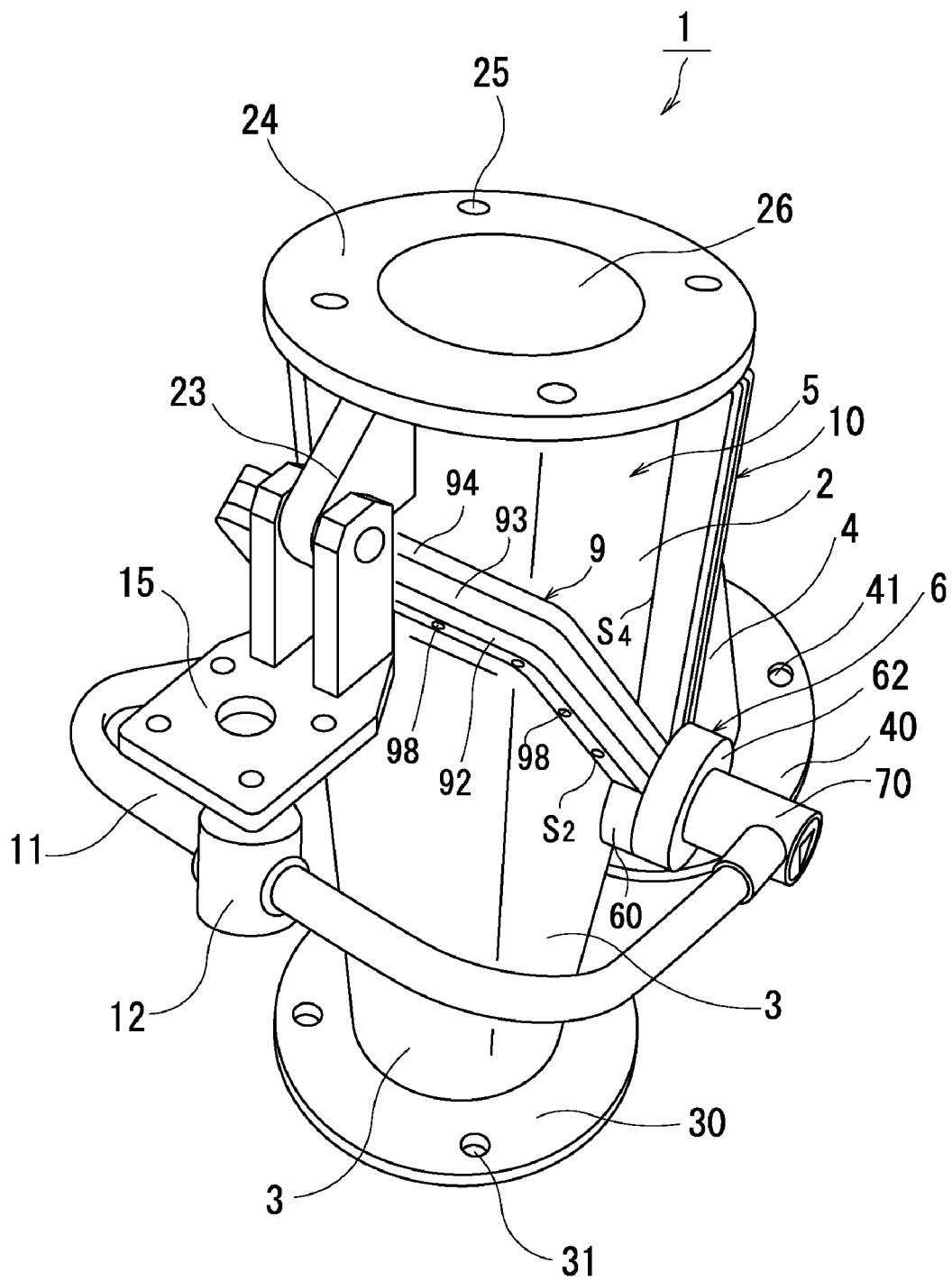
FIG. 4 is a perspective view showing the flow path switchover device of the embodiment from a different angle.
Figure 6:
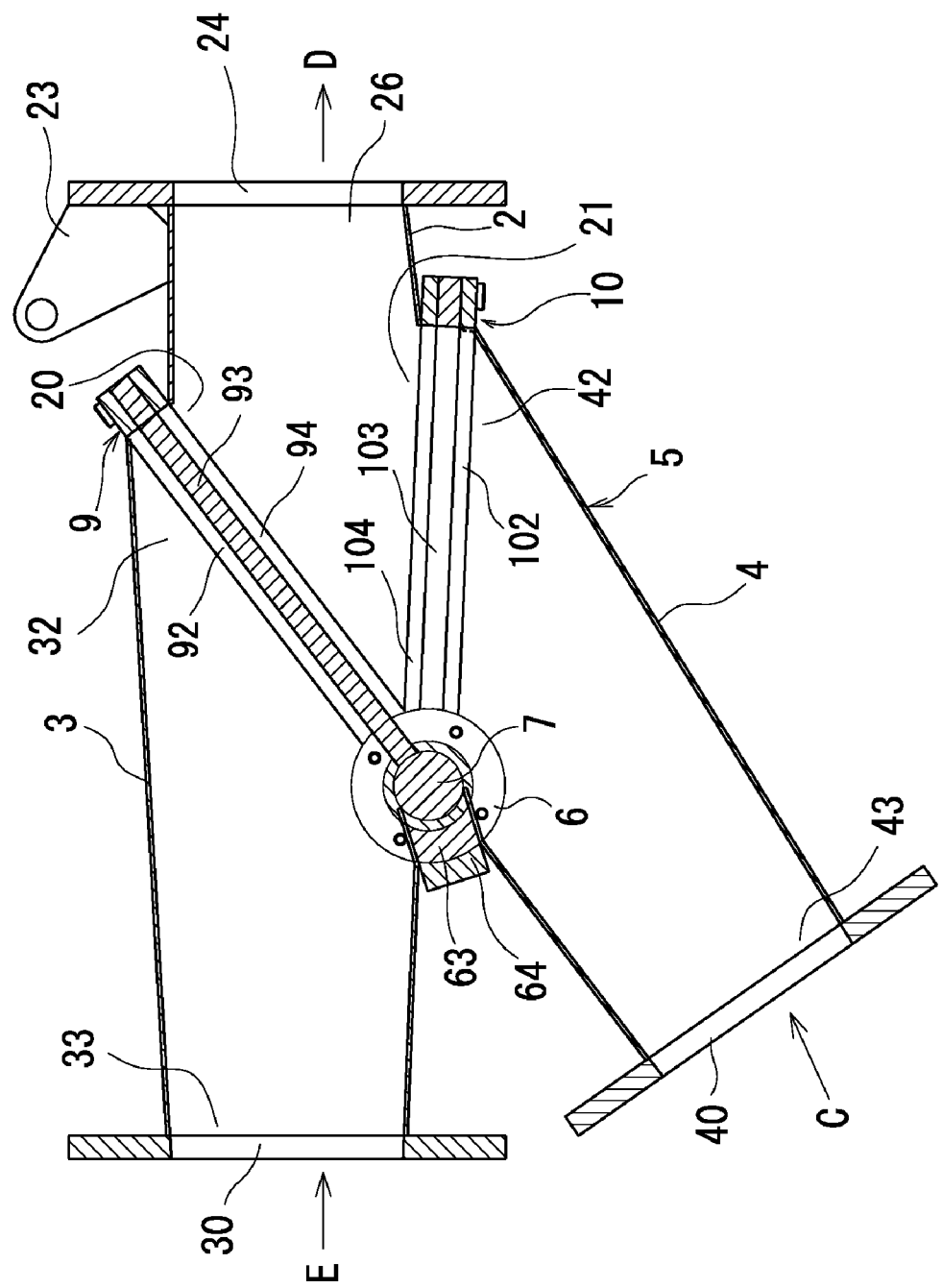
FIG. 6 is a vertical sectional view showing the inside of the flow path switchover device of the embodiment.
Figure 8:
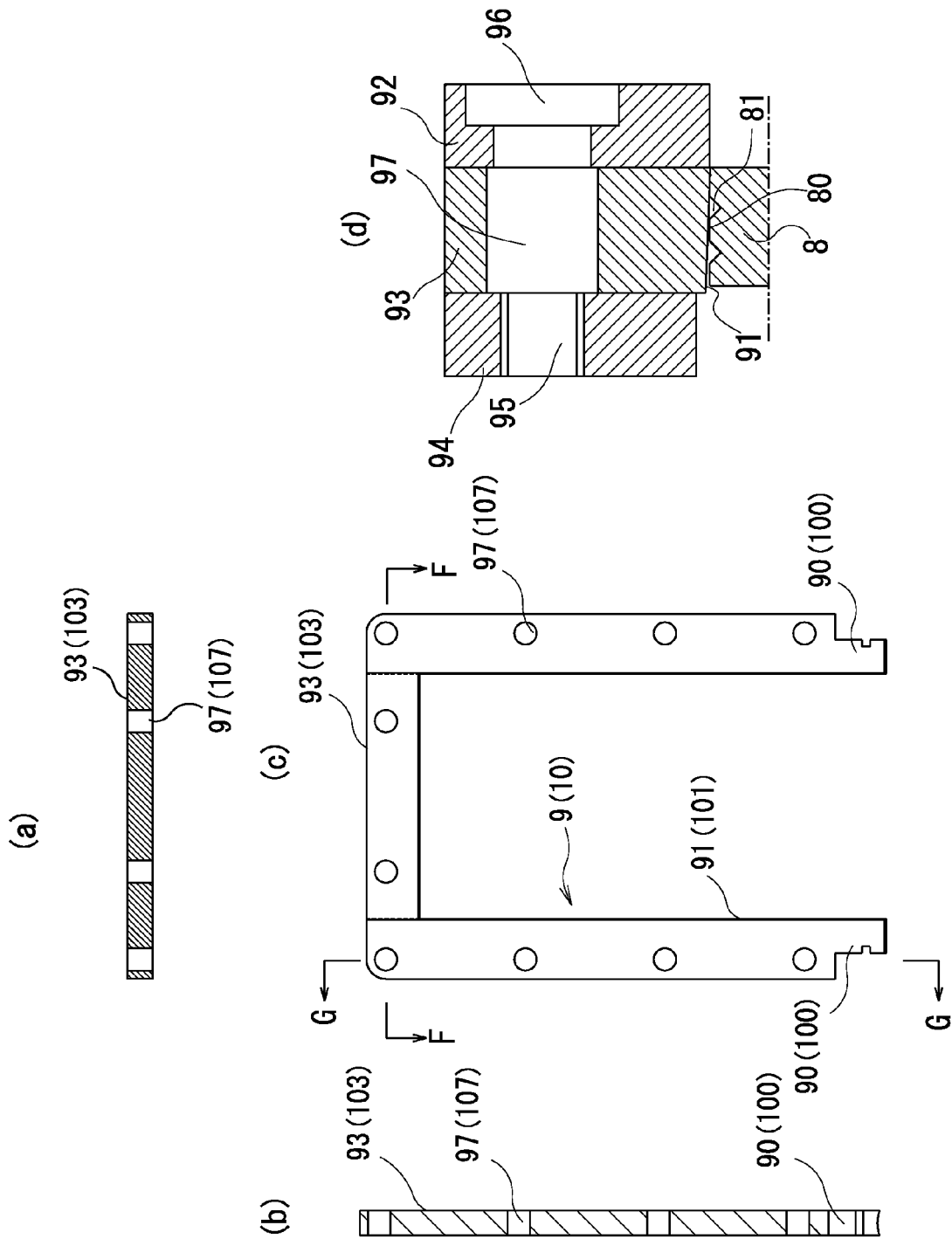
FIG. 8(a) is a sectional view showing the middle steel plate taken along an F-F line in FIG. 8(c)
FIG. 8(b) is a sectional view showing the middle steel plate taken along a G-G line in FIG. 8(c)
FIG. 8(c) is a plan view showing the middle plate.
FIG. 8(d) is a vertical sectional view showing a clamping structure of steel plates.
Figure 9:
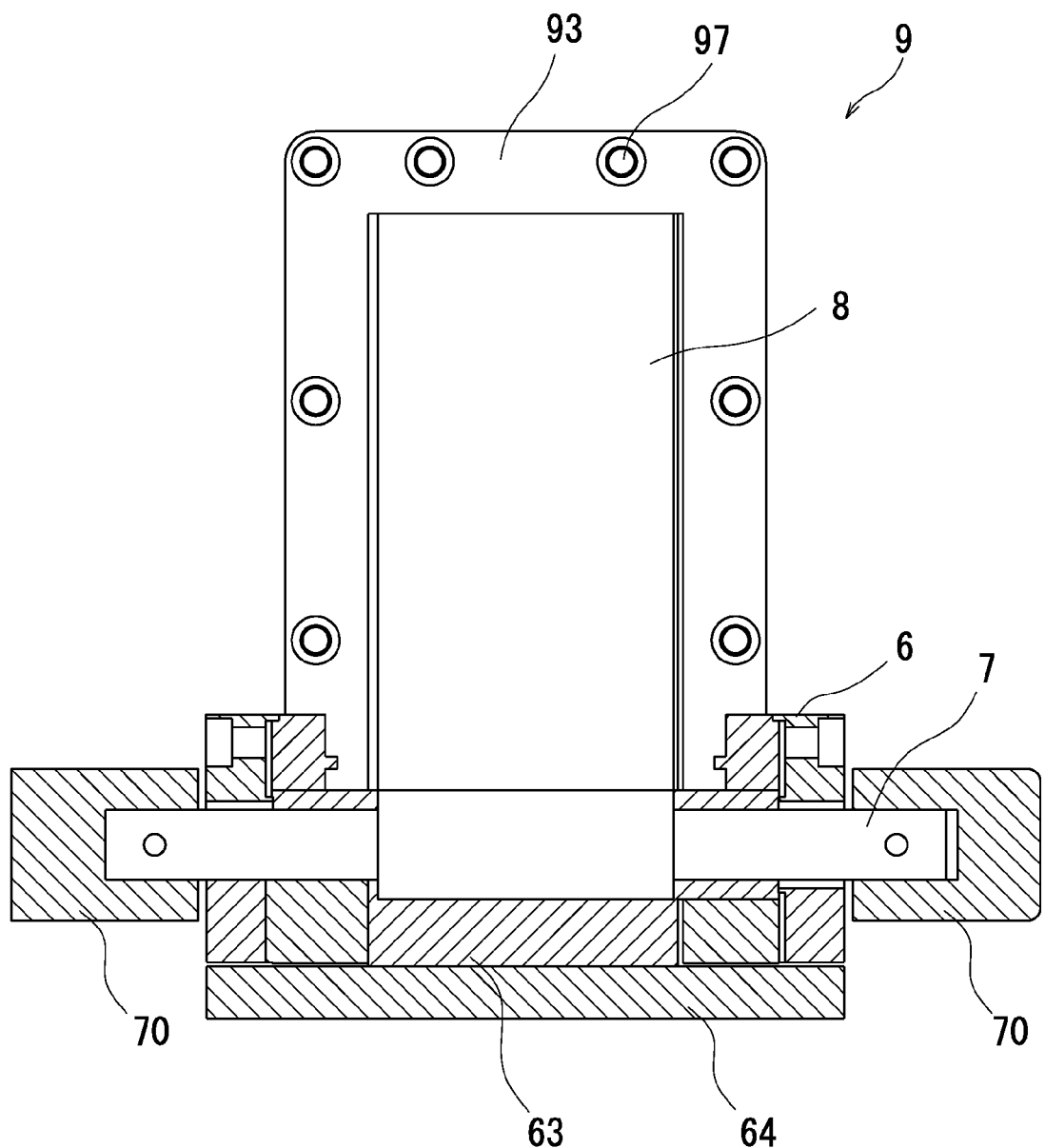
FIG. 9 is a partial sectional view showing a changeover damper, a rotating shaft, and bearing members included in the flow path switchover device of the embodiment.

The first ring member 9 has a laminate structure including three U-shaped steel plates 92, 93, and 94. The middle steel plate 93 is interposed between the two side steel plates 92 and 94. These three steel plates 92, 93, and 94 are integrated with bolts 98 that are screwed into screw holes 95 formed in the steel plate 94 and are fit into through holes 96 and 97 formed in the steel plates 92 and 93. This laminate structure allows a positional shift of the middle steel plate 93 and compensates for the production error. The bolts 98 are loosened for adequate positioning and are then tightened. This enhances the processing accuracy (adjustment accuracy) of the sealing and effectively prevents the air leakage. The middle steel plate 93 has the open end 90, which is caught by the boss 60 and/or the recess of the bearing end 62 to allow adjustment of the position. The lower ends of the side steel plates 92 and 94 are fit in the boss 60 and/or the recess of the bearing end 62. The inner circumferential ends of the steel plates 92 and 94 are welded to the second main tube member 3 and the first main tube member 2, respectively. The first ring member 9 accordingly has two U-shaped first connection lines $S_1$ and $S_2$ (see FIGS. 2 and 4). The second ring member 10 similarly has a laminate structure including three steel plates 102, 103, and 104. The second ring member 10 has like elements to those of the first ring member 9. These like elements are expressed by the like numerals in the 100s instead of in the 90s and are not specifically explained. The second ring member 10 also has two U-shaped second connection lines $S_3$ and $S_4$ (see FIGS. 2 and 4). The edge of the second main tube member 3 is continuous with the first connection line $S_2$ and is welded to the outer circumference of the boss 60. The edge of the branch tube member 4 is continuous with the second connection line $S_3$ and is welded to the outer circumference of the boss 60. The steel plates 94 and 104 are welded to each other via a connection line, which is formed in the axial direction and is continuous with the first connection line $S_1$ and with the second connection line $S_4$. There are other welding spots according to the requirements. For example, the connection line for welding the steel plate 94 to the steel plate 104 is continuous with a connection line for welding the outer circumferential end face of the steel plate 104 to the boss 60 and is continuous with a connection line for welding the steel plate 94 to the boss 60. In the state of FIG. 1, the changeover damper 8 is in pressure contact with the first ring member 9 as shown in the decomposed view of FIG. 3. In the state of FIG. 4, the changeover damper 8 is in pressure contact with the second ring member 10 as shown in the decomposed view of FIG. 5.

The changeover damper 8, the first ring member 9, and the second ring member 10 are machined metal steel parts and are obtained, for example, by machining a rolled steel SS 400 flat bar for general structure with a machine tool. The changeover damper 8, the first ring member 9, and the second ring member 10 are plated with chromium (Unichrome) or nickel chromium and have greater thicknesses than the wall thickness of the tube assembly 5. The edge of the first main tube member 2 for defining the first opening 20 is welded to the inner end of the main surface of the steel plate 94, while the edge of the first main tube member 2 for defining the second opening 21 is welded to the inner end of the main surface of the steel plate 104. The edge of the second main tube member 3 for defining the opening 32 is welded to the outer circumference of the boss 60 and is welded to the inner end of the main surface of the steel plate 92. The edge of the branch tube member 4 for defining the opening 42 is welded to the outer circumference of the boss 60 and is welded to the inner end of the main surface of the steel plate 102. The bases of the steel plates 92, 94, 102, and 104 are respectively welded to the outer circumferential face of the boss 60. The first ring member 9 and the second ring member 10 are extended outward from the surfaces of the first main tube member 2, the second main tube member 3, and the branch tube member 4 to be externally clamped.

The operations of the flow path switchover device 1 for particulate transport are described with reference to the accompanied drawings. The flow path switchover device 1 of the embodiment having the above structure is built in a particulate transport device disclosed in Patent Document 1. The detailed structure of the particulate transport device is to be referred to the description of Patent Document 1. The flow path switchover device 1 is located in the middle of a transport pipe (not shown), and the changeover damper 8 is operated and switched to allow connection with either of two material tanks (not shown). In order to receive a material particulate flow from one material tank located upstream of the branch tube member 4, the piston rod 13 is extended in the direction of an arrow A in FIG. 1. As shown by an arrow B in FIG. 1, the changeover damper 8 and the swing lever 11 are then integrally swung about the rotating shaft 7 as the supporting point to switch over the flow path. The changeover damper 8 is in pressure contact with the first ring member 9. The end of the outer circumferential end face 80 of the changeover damper 8 is accordingly in pressure contact with the inner circumferential end face 91 of the middle steel plate 93. As shown by arrows C and D in FIG. 1, the required material particulate is fed from the material tank and is flowed through the curved pathway from the branch tube member 4 to the first main tube member 2. In order to receive a material particulate flow from the other material tank located upstream of the second main tube member 3, on the other hand, the piston rod 13 is contracted in the direction of the arrow A in FIG. 1. As shown by the arrow B in FIG. 1, the changeover damper 8 and the swing lever 11 are then integrally swung about the rotating shaft 7 as the supporting point to switch over the flow path. The changeover damper 8 is in pressure contact with the second ring member 10. The end of the outer circumferential end face 80 of the changeover damper 8 is accordingly in pressure contact with the inner circumferential end face 101 of the middle steel plate 103. As shown by arrows E and D in FIG. 1, the required material particulate is fed from the other material tank and is flowed through the linear pathway from the second main tube member 3 to the first main tube member 2.

The flow path switchover device 1 of this embodiment has the two-way tubular assembly 5. The technique of the invention is also applicable to a three-way tubular assembly within the scope of the invention.

The structure of the embodiment has the following effects. The sealing is formed by the pressure contact between the metal changeover damper 8 and the metal first ring member 9 or the pressure contact between the metal changeover damper 8 and the metal second ring member 10. This structure desirably restrains any contamination and invasion of any foreign matters, for example, fractured sealing pieces, mold, and bugs and effectively prevents the air leakage. The tube assembly 5 consists of the three parts, that is, the first main tube member 2, the second main tube member 3, and the branch tube member 4. The first ring member 9 and the second ring member 10 are manufactured as separate parts with the high accuracy. This attains the stable sealing of the high processing accuracy. For example, the tube assembly 5 is produced by the sheet metal processing, while the first ring member 9 and the second ring member 10 are machined with a laser beam machine. The first ring member 9 and the second ring member 10 are then welded to the tube assembly 5 for the enhanced processing accuracy. This structure facilitates the attachment of the first ring member 9 and the second ring member 10 and effectively prevents the potential air leakage. The presence of the grooves 81 enhances the sealing property. The flow path switchover device 1 of the embodiment has a housing-free structure unlike a conventional cast ball valve and is thus extremely light in weight.

The embodiment discussed above is to be considered in all aspects as illustrative and not restrictive. There may be many modifications, changes, and alterations without departing from the scope or spirit of the main characteristics of the present invention. These modified arrangements and their equivalencies are included in the scope of the invention.

What is claimed is:

1. A flow path switchover device for particulate transport comprising
    a tube assembly that includes a main tube member and a branch tube member;
    a rotating shaft that is supported on a bearing member in a freely rotatable manner; and
    a metal changeover damper that is fixed to said rotating shaft and swings about the rotating shaft as a supporting point in said tube assembly;
    wherein said main tube member has obliquely cut first main tube member and second main tube member;
    said first main tube member has a first opening and a second opening on one end thereof;
    said first opening of said first main tube member is connected with said second main tube member via a metal first ring member having an open end;
    said second opening of said first main tube member is connected with said branch tube member via a metal second ring member, which has an open end and is arranged at a preset angle with said first ring member;
    said rotating shaft and said bearing member are arranged at a boundary between said first opening and said second opening;
    said first ring member, said second ring member, said second main tube member, and said branch tube member are connected to said bearing member;
    said changeover damper swings between said first ring member and said second ring member about said rotating shaft as the supporting point; and
    an outer circumferential end face of said metal changeover damper is in pressure contact with an inner circumferential end face of said metal first ring member or with an inner circumferential end face of said metal second ring member to block and seal either connection between said first main tube member and said second main tube member or connection between said first main tube member and said branch tube member.

2. The flow path switchover device for particulate transport of claim 1, wherein
    said tube assembly is produced by sheet metal processing of a metal steel plate;
    said changeover damper, said first ring member, and said second ring member are machined metal steel parts produced by machining a metal steel plate;

said changeover damper, said first ring member, and said second ring member have larger thicknesses than a wall thickness of said tube assembly; and said first main tube member is welded to said first ring member and to said second ring member, and said second main tube member is welded to said bearing member and to said first ring member and said branch tube member is welded to said bearing member and to said second ring member.

3. The flow path switchover device for particulate transport of claim 1, wherein said first ring member and said second ring member respectively have a laminate structure including at least three U-shaped steel plates; and a middle steel plate is interposed between and fastened with at least two side steel plates.

4. The flow path switchover device for particulate transport of claim 2, wherein said first ring member and said second ring member respectively have a laminate structure including at least three U-shaped steel plates; and a middle steel plate is interposed between and fastened with at least two side steel plates.

* * * * *